United States Patent
Dor

(10) Patent No.: US 7,782,754 B2
(45) Date of Patent: Aug. 24, 2010

(54) METHOD AND APPARATUS TO SUPPORT SDMA TRANSMISSION OF A OFDMA BASED NETWORK

(75) Inventor: Avner Dor, Or Yehuda (IL)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 11/646,659

(22) Filed: Dec. 28, 2006
(Under 37 CFR 1.47)

(65) Prior Publication Data
US 2008/0159122 A1    Jul. 3, 2008

(51) Int. Cl.
*H04J 11/00* (2006.01)
(52) U.S. Cl. .......................... 370/208; 370/430
(58) Field of Classification Search ........................ None
See application file for complete search history.

(56) References Cited

U.S. PATENT DOCUMENTS

| | | | | |
|---|---|---|---|---|
| 5,914,946 | A * | 6/1999 | Avidor et al. | 370/336 |
| 7,391,819 | B1 * | 6/2008 | von der Embse | 375/295 |
| 2005/0277444 | A1 * | 12/2005 | Rensburg et al. | 455/562.1 |
| 2006/0164972 | A1 * | 7/2006 | van Rensburg et al. | 370/208 |
| 2006/0211441 | A1 * | 9/2006 | Mese et al. | 455/522 |
| 2006/0286974 | A1 | 12/2006 | Gore et al. | |
| 2007/0249296 | A1 * | 10/2007 | Howard et al. | 455/101 |

FOREIGN PATENT DOCUMENTS

| | | |
|---|---|---|
| CN | 101569116 A | 10/2009 |
| TW | 200841627 | 10/2008 |
| WO | 2008/082848 A1 | 7/2008 |

OTHER PUBLICATIONS

Mauro, B. et al., "Single cell OFDMA/SDMA allocation algorithm for multiple user in real systems", In: *IEEE IWS2005/WPMCÂ?05, Proceedings*, Aalborg, Denmark, (Sep. 2005).
Tsunekawa, et al., "Beamforming and antenna design techniques for realizing wideband MIMO-OFDM system", In: *Antennas and Propagation Society International Symposium*, IEEE, vol. 2A, (Jul. 3-8, 2005),329-332.
International Search Report/Written Opinion for PCT Patent Application No. PCT/US2007/086679, Mailed May 19, 2008,10 Pages.
Dimic, G , et al., "Low complexity downlink beamforming for maximum capacity", *Proceedings of ICASSP-04*, vol. 4, (May 17-21, 2004),pp. 701-704.
Fuchs, M , et al., "A novel tree-based scheduling algorithm for the downlink of multi-user MIMO systems with ZF beamforming", *Proceedings of ICASSP 05*, (Mar. 18-23, 2005),1121-1124.

(Continued)

*Primary Examiner*—Jayanti K Patel
*Assistant Examiner*—Hooman Houshmand
(74) *Attorney, Agent, or Firm*—Thorpe North & Western LLP

(57) ABSTRACT

Techniques are provided for efficiently optimizing scheduling and beamforming in an OFDMA-based wireless network that uses SDMA. The techniques are capable of achieving a high level of spectral efficiency and throughput in a low complexity manner while still addressing quality of service (QoS) constraints.

20 Claims, 7 Drawing Sheets

OTHER PUBLICATIONS

Jindal, Vishwanath N., et al., "Duality, Achievable Rates, and Sum-Rate Capacity of Gaussian MIMO Broadcast Channels", *IEEE Trans. on Information Theory*, vol. 49, Issue 10, (Oct. 2003),pp. 2658-2668.

NG, C T., et al., "Capacity of Fading Broadcast Channels with Rate Constraints", *Allerton conference on communications, control and computing* (available also through http://systems.stanford.edu/Publications.html#ChrisNg). (Aug. 2000),1-10.

International Preliminary Report on Patentability and Written Opinion for PCT Patent Application No. PCT/US2007/086679, mailed on Jul. 9, 2009, 5 pages.

Yu, W. et al., "Iterative Water-Filling for Gaussian Vector Multiple-Access Channels", IEEE Transactions on Information Theory, vol. 50, No. 1, Jan. 2004, 16 pages.

\* cited by examiner

US 7,782,754 B2

METHOD AND APPARATUS TO SUPPORT SDMA TRANSMISSION OF A OFDMA BASED NETWORK

TECHNICAL FIELD

The invention relates generally to wireless communication and, more particularly, to systems using orthogonal frequency division multiple access (OFDMA) or other techniques involving multiple parallel channels.

BACKGROUND OF THE INVENTION

Orthogonal frequency division multiplexing (OFDM) is a multicarrier communication technique that uses a number of closely spaced orthogonal carriers to transmit data through a communication channel. Orthogonal frequency division multiple access (OFDMA) is a form of OFDM that allows multiple users to share the subcarriers of an OFDM band. Spatial division multiple access (SDMA) is a technique that allows multiple users to share a communication resource (e.g., a frequency channel, etc.) by taking advantage of the spatial dimension. Techniques are needed for efficiently implementing SDMA within OFDMA systems.

DETAILED DESCRIPTION

Figure 1:
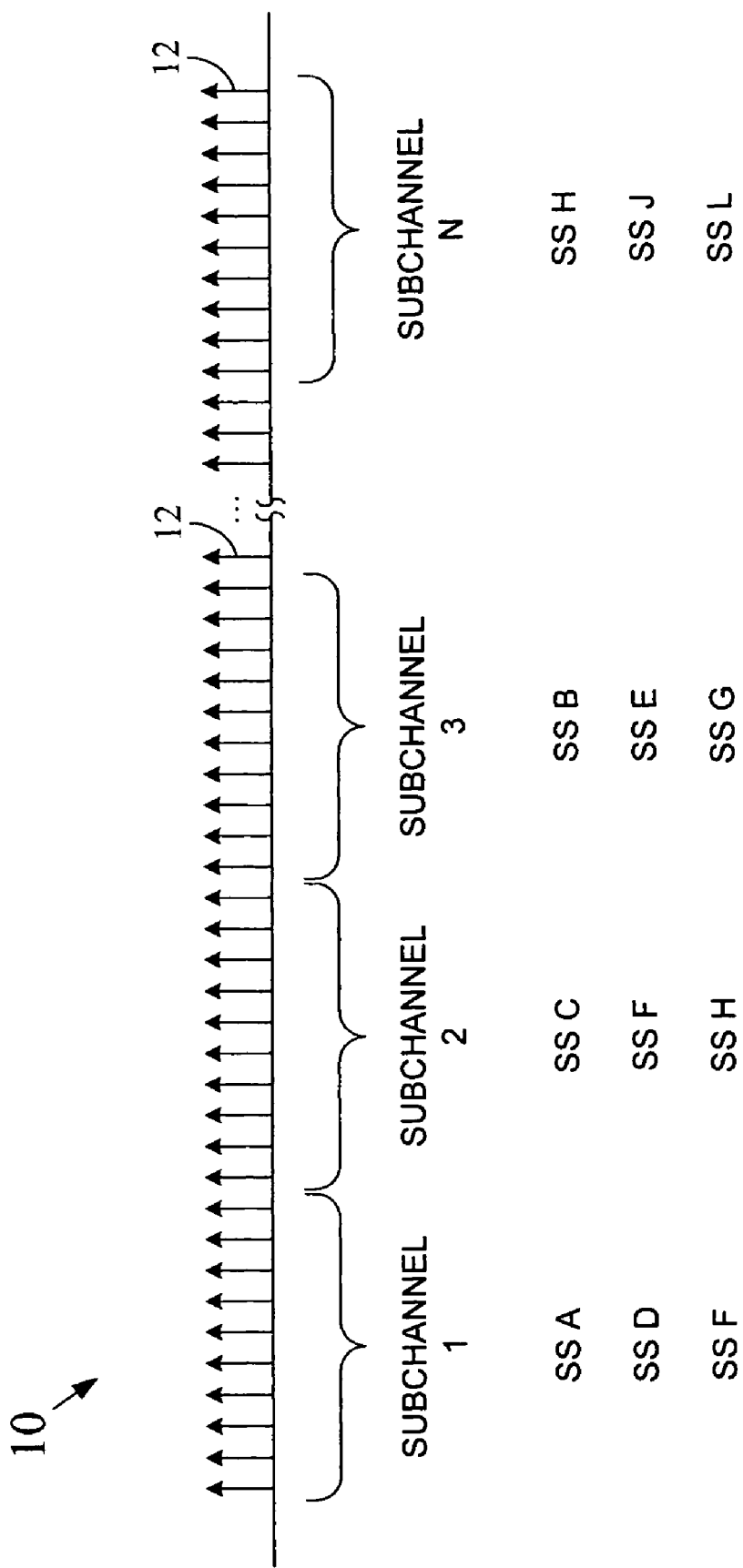
FIG. 1 is a diagram illustrating an example OFDM symbol that may be used within an OFDMA-based network in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

OFDM is a multicarrier communication technique that uses a plurality of orthogonal subcarriers to transfer information through a communication channel. Each subcarrier may be modulated with a different data symbol. All of the modulated subcarriers may be transmitted together as a single "OFDM symbol." OFDM symbols may be transmitted one after another through a channel to achieve high data rate communication. In a traditional OFDM approach, each OFDM symbol transmitted by a base station (BS) is intended for a single user (e.g., a single subscriber station (SS) within the coverage region of the BS). That is, all of the data subcarriers of the OFDM symbol will, if used, carry information for a single user. Orthogonal frequency division multiple access (OFDMA) is an extension of OFDM that allows the subcarriers of an OFDM band to be allocated among a number of different users. Thus, when a BS transmits an OFDM symbol in an OFDMA-based network, some of the subcarriers within the OFDM symbol may be carrying data for a first user, some of the subcarriers may be carrying data for a second user, and so on. Similarly, when the BS receives an OFDM symbol in the OFDMA-based network, some of the received subcarriers may be carrying data from the first user, some of the subcarriers may be carrying data from the second user, and so on. A scheduler may be provided within the BS to determine when, and in which subcarriers, data will be transmitted from the BS to the individual SSs and when, and in which subcarriers, data will be transmitted from the individual SSs to the BS. This information may be communicated to the corresponding SSs in the form of MAP data transmitted by the BS.

In a typical OFDMA arrangement, the OFDM band is divided into a number of subchannels that each include one or more subcarriers. Each subchannel within an OFDM symbol may be allocated to a different user by the scheduler. The users that are allocated to the various subchannels may also change with time. For example, within a first OFDM symbol, a first subchannel may be allocated to user A while in a subsequent OFDM symbol the first subchannel is allocated to user D, and so on.

SDMA is a technique that takes advantage of a spatial separation between antenna beams to allow multiple users to share a communication resource. When SDMA is used within an OFDMA based system, each subchannel within an OFDM bandwidth may be shared by multiple users by generating spatially separated antenna beams for the users. FIG. 1 is a diagram illustrating an example OFDM symbol 10 that may be used within an OFDMA based system in accordance with an embodiment of the present invention. As shown, the OFDM symbol 10 includes a plurality of subcarriers 12. Most of these subcarriers 12 are data subcarriers that may carry user data to and from the various users. Some of the subcarriers 12, however, may be pilot subcarriers that can be used to facilitate, for example, channel estimation within the network. The subcarriers 12 are divided into multiple subchannels (i.e., subchannels 1, 2, 3, ..., N) that may each include one or more subcarriers. In the illustrated embodiment, each of the subchannels is allocated for use by multiple users. That is, subchannel 1 is allocated for use by subscriber station (SS) A, SS D, and SS F; subchannel 2 is allocated for use by SS C, SS F, and SS H; and so on. The reason that multiple users are able to share each subchannel is because beamforming techniques are being used to spatially separate transmissions to the various users sharing each subchannel (using SDMA).

Figure 2:
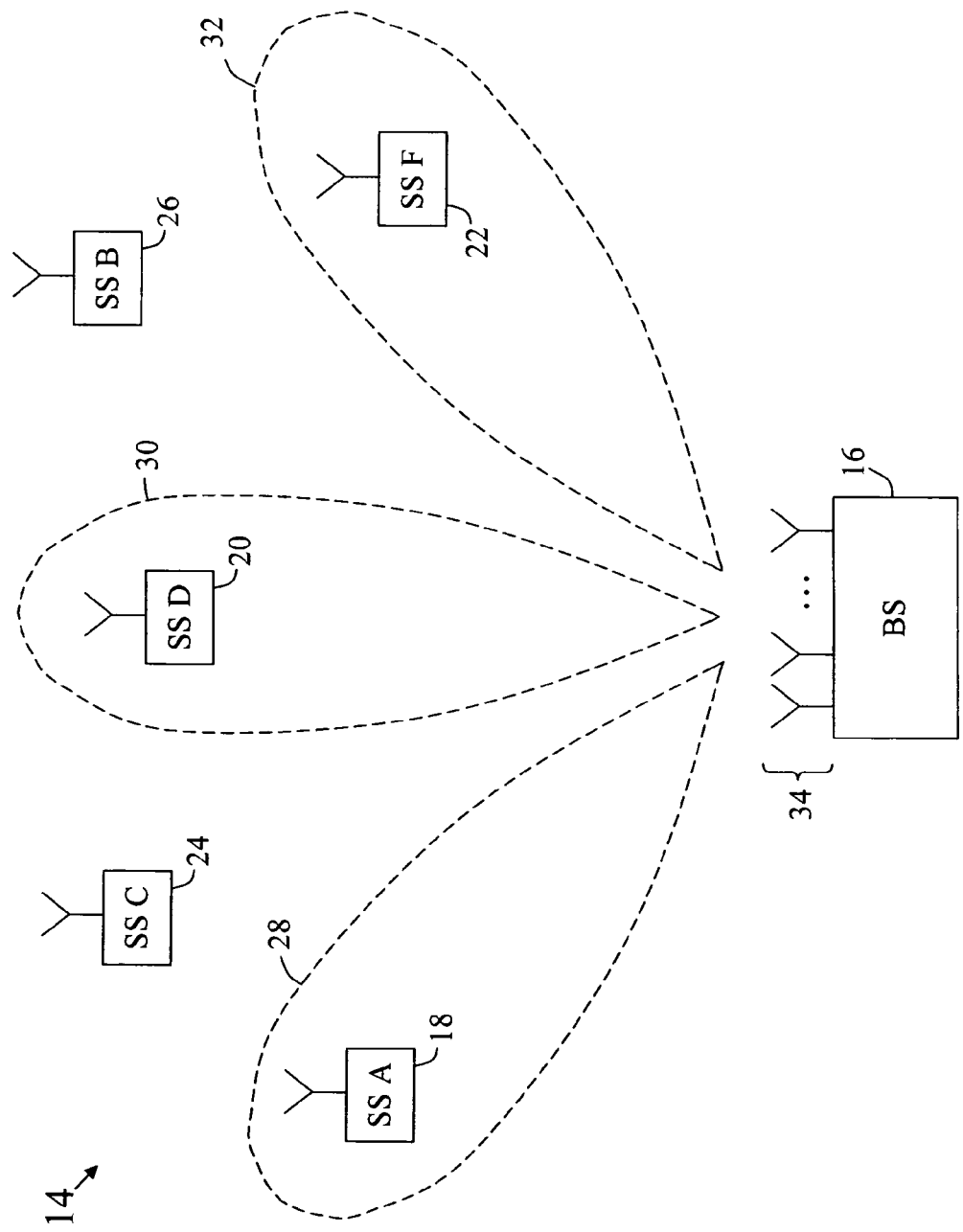
FIG. 2 is a block diagram illustrating an example of the spatial separation that may be achieved between antenna beams by using beamforming (BF) techniques within a wireless network in accordance with an embodiment of the present invention.

FIG. 2 is a block diagram of an example network arrangement 14 that illustrates the spatial separation that may be achieved between antenna beams by using beamforming (BF) techniques within a wireless network in accordance with an embodiment of the present invention. As shown, a BS 16 is providing communication services to a number of SSs 18, 20, 22, 24, 26 within a corresponding coverage region or cell. The BS 16 has a plurality of antennas 34 that may be used to facilitate wireless communication with the SSs 18, 20, 22, 24, 26. By using beamforming techniques with the plurality of antennas 34, multiple different antennas beams, that are spatially separate from another, may be generated for each subchannel of the OFDMA system. Because the beams are spatially separate, a transmission from the BS 16 within one of the beams will cause little or no interference to a SS within another beam. Similarly, a transmission from one of the SSs within a particular beam will be separable from transmissions from within other beams when received by the BS 16. For example, with reference to FIG. 2, SS A 18, SS D 20, and SS F 22 can share a subchannel because each of these units is serviced by a respective beam 28, 30, 32 that is spatially separate from the beams servicing the other two. A similar arrangement may be used within each of the other available subchannels of the OFDMA system.

Linear beamforming is a technique that applies a weighting coefficient to each antenna in a plurality of antennas in a manner that generates a beam having desired characteristics. In a base station having n transmit antennas, the antenna weights may be expressed as a vector of length n that contains the weighting coefficients for each antenna. The BF vectors may be normalized, with the original norm being the assigned power of the beam. In a typical SDMA scenario, the signal to interference and noise ratio (SINR) experienced by user k (having a single receive antenna) for a flat fading channel may be expressed as:

$$SINR_k = \frac{p_k |v_k h_k^*|^2}{\sigma_k^2 + \sum_{j \neq i} p_j |v_j h_k^*|^2}$$

where $v_k$ is the BF vector associated with user k, $h_k$ is the channel vector associated with the user k, $p_k$ is the power level associated with the user k, and $\sigma_k^2$ is the noise associated with user k (thermal noise+interference from adjacent cells). SDMA optimization is typically interested in wisely choosing the set of vectors $\{v_i\}$ and the set of powers $\{p_i\}$. However, in a practical multi-user OFDMA system, SDMA optimization is also subject to scheduling requirements. That is, the rates of the users must satisfy certain quality of service (QoS) constraints. Optimization methods that are only concerned with throughput will often fail to provide agreed upon QoS levels for the various users.

The present invention relates to techniques for use in achieving enhanced throughput and spectral efficiency in an SDMA/OFDMA environment while also addressing QoS issues. Techniques are also provided for achieving this throughput enhancement with relatively low computational complexity. In at least one embodiment, a two stage approach is used. In a first stage, a small subset of users is selected for each of the available subchannels in a network coverage region. This subset will be referred to herein as the "active set" of the subchannel. In a second stage, joint optimization of scheduling and physical beamforming is performed for the coverage region. This joint optimization is an iterative process that adjusts the power levels of various users based on rate constraints and then re-optimizes the beamforming for the subchannels in which the user power was modified, in a repetitive manner. By performing the first stage before the joint optimization stage, in many cases, the overall computational complexity of the optimization process can be reduced considerably with only a small performance penalty. The joint optimization stage may also be performed without first performing the subset selection stage.

It has been determined that BF optimization based on linear pre-coding is capable of achieving throughputs that are close to the theoretical limit in an OFDM/SDMA broadcast environment. However, when a large number of users is processed by such an optimization technique, the complexity of the operation often increases beyond a level that is practical to perform in real-time. When the number of users K in a coverage region is relatively large (e.g., K=10 to 30), simulations have shown that the number of users that have positive power at the end of a BF optimization process rarely exceeds the number of base station antennas n that are being used. The number of antennas within a base station is often restricted in practice to a relatively low number (e.g., 2-4). Based on the foregoing, it was determined that a significant reduction in overall complexity could be achieved by reducing the number of active users associated with each subchannel before a final BF optimization is undertaken.

In the discussion that follows, an active set predictor (ASP) process is described that may be used for selecting an active set of users for a given bandwidth resource (e.g., an OFDMA subchannel), without regard to QoS constraints. The ASP process is a low complexity iterative procedure that finds a high yield active set of a small size prior to BF optimization. In at least one embodiment, the number of users within each active set is made equal to the number of antennas n used by the base station. In other embodiments, other numbers of active users may be used. For example, one or more wireless standards may limit the number of users that can be served over a single resource (e.g., the IEEE 802.16e standard limits this number to 4).

Figure 3:
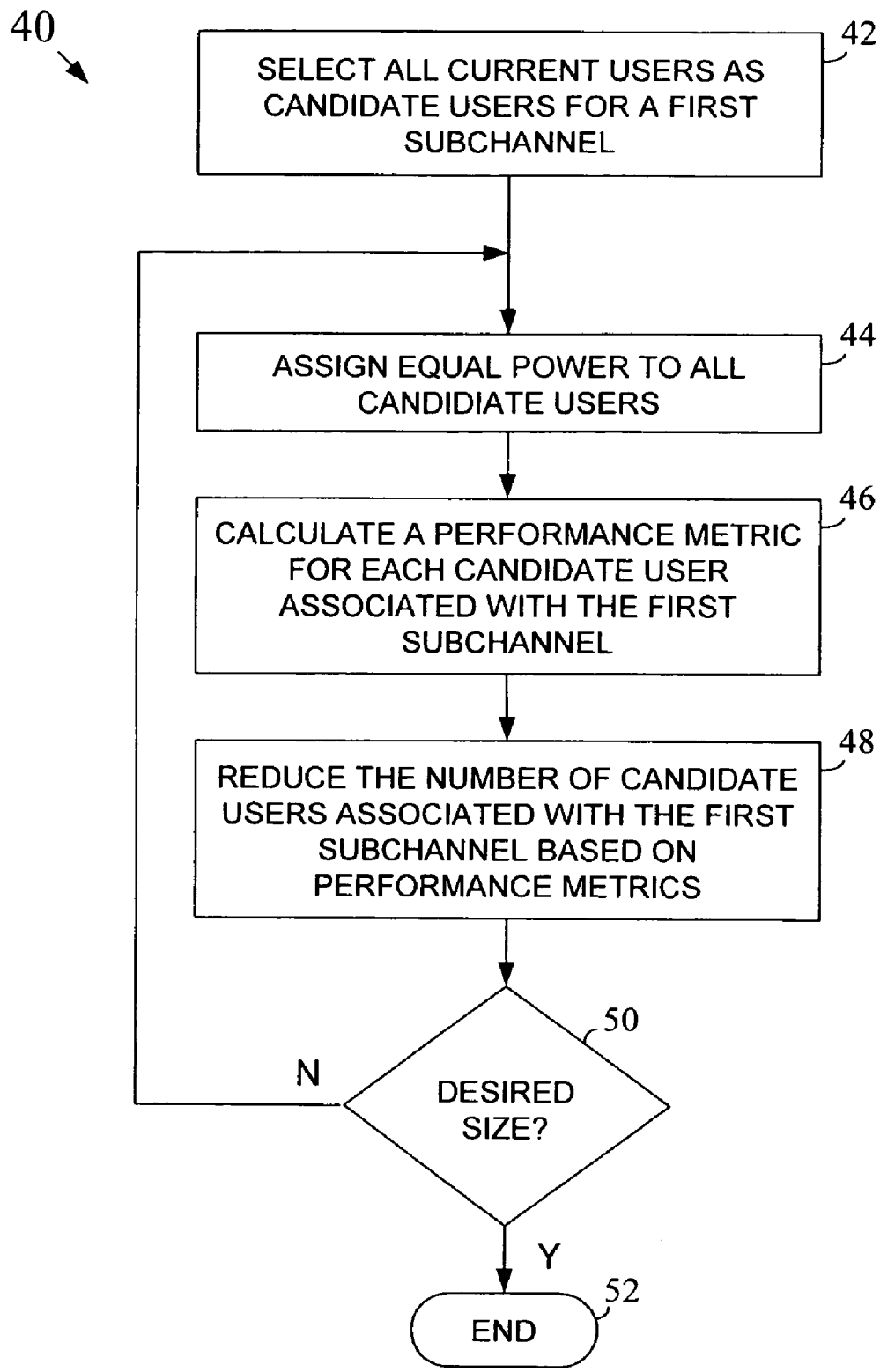
FIG. 3 is a flowchart illustrating an example method for selecting a subset of users to share a first subchannel within an OFDMA-based network in accordance with an embodiment of the present invention.

FIG. 3 is a flowchart illustrating an example method 40 for use in selecting a subset of users to share a subchannel within an OFDMA-based network in accordance with an embodiment of the present invention. The method 40 is an example of the active set predictor (ASP) process discussed previously. As illustrated, all K current users are initially selected as candidate users for a first subchannel (block 42). Equal power is then assigned to all candidate users for the first subchannel (block 44). A performance metric is next calculated for each of these candidate users (block 46). In at least one embodiment, the performance metric is a "rate" associated with the candidate user that is maximized through computation of an optimal (normalized) beam vector for the user. The beam vector optimization is done based on the current candidate set and the current power assignment.

The number of candidate users associated with the first subchannel is next reduced based on the calculated performance metrics (block 48). If the performance metric is a rate as described above, then the number of candidate users may be reduced by rejecting candidate users having the lowest rates and keeping the candidate users having the highest rates. The extent of the reduction may be specified in any of a variety of different ways. For example, in one possible approach, the size of the new candidate set may be a constant fraction of the size of the previous candidate set (e.g., 50%, etc.). Other strategies for reducing the size of the candidate set may alternatively be used. It is next determined if the new size of the candidate set for the first subchannel is the desired size (block 50). If the desired size has not yet been reached, the method 40 may return to block 44 and equal power is assigned to all candidate users in the new candidate set. Performance metrics are then calculated for candidate users in the new candidate set (block 46) and the number of candidate users will again be reduced based on performance metrics (block 48). The process will then repeat until the desired size of the candidate set has been reached (block 50-Y), at which time the method 40 terminates (block 52). In at least one embodiment, the reduction in block 48 will not reduce the number of candidate users below the desired number of users.

When a fixed candidate set reduction fraction of 50% is used in the above-described method, the number of iterations to reach the desired set size ($k_o$) is roughly $\log_2(K/k_o)$. In practice, this will typically require 1-4 iterations. The overall complexity of the above-described procedure may be upper-bounded by the complexity of 2 beam vector optimization iterations of a K-user BF process.

As described above, in at least one embodiment, the performance metric that is used in an ASP process is a rate associated with a candidate user that is maximized through computation of an optimal (normalized) beam vector. The computation of the optimal beam vectors for rate maximization may be performed in a variety of ways. In one possible approach, for example, the computation is based on uplink-downlink duality. Assume the total transmit power for the current candidate set is P (P>0) and the current size of the set is k. The current power vector for the candidate set is $p=(p_1, p_2, \ldots, p_k)$, where $p_1+p_2+\ldots+p_k=P$. In one approach, $p_i$ may be set equal to P/k. The vector $h_i$ is an n-dimensional channel vector for user i (i=1, ..., k). The rate maximization may be performed as follows. First, a parameter S may be calculated using the equation:

$$S = I_{n \times n} + \Sigma_{1 \leq j \leq k} p_j \cdot h_j \cdot h_j^* \quad \text{(Equation 1)}$$

where $I_{n \times n}$ is an n×n identity matrix. Then, $S_i$ is calculated for users 1 through k as follows:

$$S_i = S - p_i \cdot h_i \cdot h_i^* \quad \text{(Equation 2)}$$

It should be noted that $S_i$ is a positive Hermitian matrix which enables stable inversion. Next, the maximized uplink SINR for users 1 through k may be computed as follows:

$$\text{max\_uplink\_SINR}_i = p_i \cdot \text{max\_eigen\_value}(S_i^{-1} \cdot h_i \cdot h_i^*). \quad \text{(Equation 3)}$$

This optimization may be performed using, for example, minimum mean square error (MMSE) computation. It should be noted that:

$$S = I + H \cdot D \cdot H^*$$

where H is the n×k matrix whose j-column is $h_j$ and D is a diagonal k×k matrix where $D = \text{diag}(p_1 \ldots p_k)$.

The ASP process described above may be used to find a subset of users to share each subchannel in an OFDMA system, without regard to QoS. In the discussion below, this concept is extended to provide a small subset of active users within each of a plurality of parallel channels while taking QoS into account. This process will be referred to as the Frame-Wise Active Set Predictor (FW-ASP) process. Provisions of QoS can be translated into specialized minimum and maximum per-frame rate constraints assigned to each user. The FW-ASP process is a low complexity iterative procedure that chooses an active set of users per sub-channel that enables a relatively high spectral efficiency to be achieved. As will be described in greater detail, the FW-ASP is capable of providing active sets that satisfy, or at least come close to, the QoS-related minimum rates per-frame for the users. Like the ASP process described previously, the FW-ASP process may be used before a BF optimization process to significantly reduce the computational complexity thereof. In at least one embodiment, the FW-ASP process also provides power allocation, beam-vectors, and possibly initial weights to the subsequent BF optimization process to achieve a further reduction in the complexity of the optimization.

Figure 4:
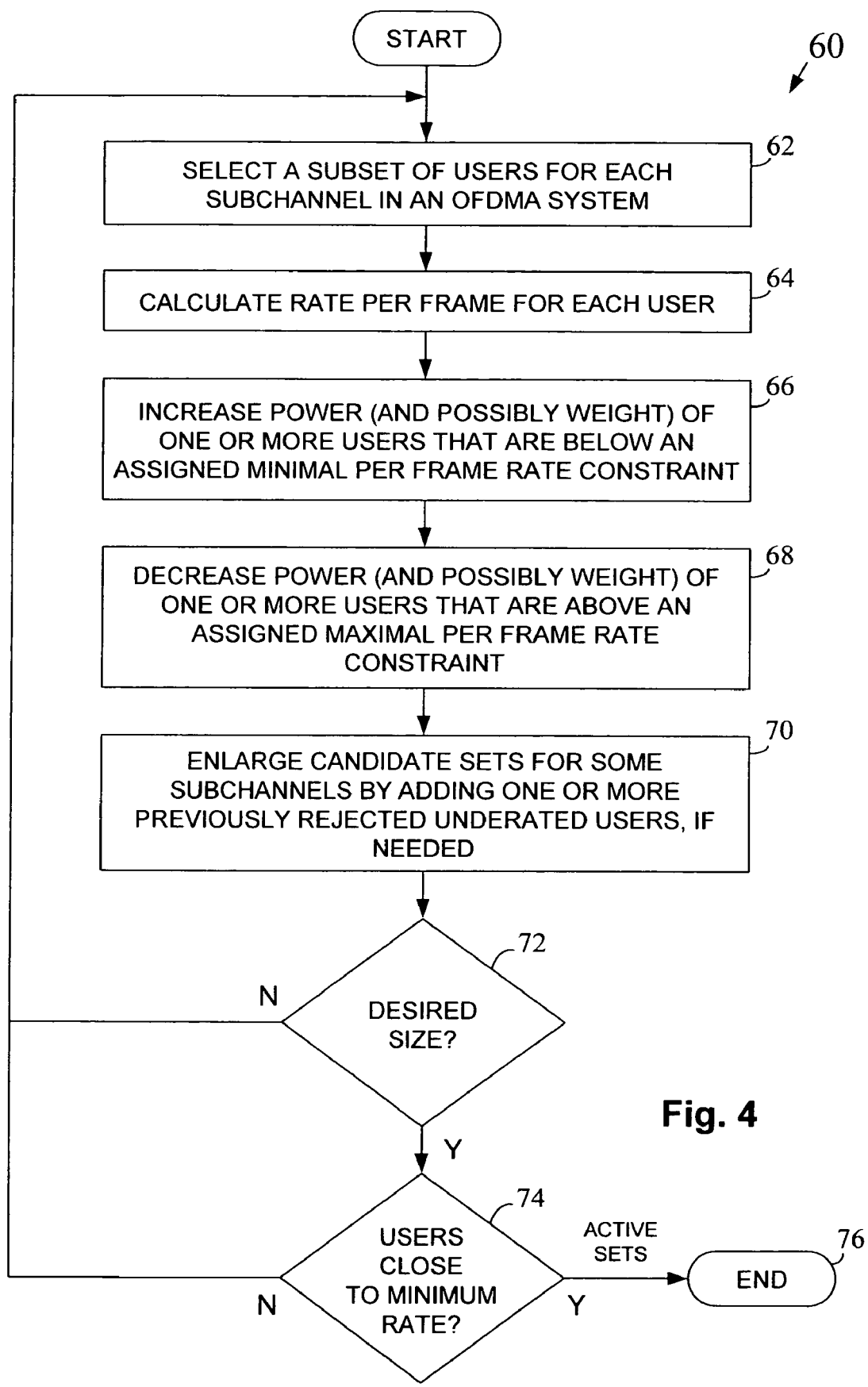
FIG. 4 is a flowchart illustrating an example method for use in selecting small active user sets for a plurality of parallel channels in a communication network in accordance with an embodiment of the present invention.

FIG. 4 is a flowchart illustrating an example method 60 for use in selecting small active user sets for a plurality of parallel channels in a communication network in accordance with an embodiment of the present invention. The method 60 represents one possible implementation of the FW-ASP process. The method 60 may be used within an OFDMA-based network implementing SDMA to select initial sets for subchannels before a BF optimization is performed. Other applications also exist. Referring now to FIG. 4, the method 60 first selects a small subset of users with high throughput potential for each of the subchannels of the OFDMA network, without regard to QoS (block 62). The ASP process described previously (e.g., method 40 of FIG. 3) may be used to perform this subset selection within each of the subchannels. After the subsets have been selected, a rate per frame parameter is calculated for each user (block 64). The word "frame" is referring to a single OFDMA symbol, including all subchannels. The rate per frame of a user is calculated by adding up the rates of the user within all of the subchannels that have the user in their active set.

Next, the powers (and possibly the priority weights) of one or more users that are below their assigned QoS-related minimum per frame rate constraint are increased (block 66). The increase may be in the form of a predetermined increment value. This increase is intended to increase the user's per frame rate so that it at least approaches the minimum constraint. The power (and possibly the priority weight) of one or more other users that are above their assigned QoS-related maximum per frame rate constraint may then be decreased (block 68). In at least one embodiment, this power decrease will be equal to the power increase performed previously so that the total power remains the same. The power decrease will most likely decrease the user's per frame rate, but will not decrease the rate below the minimum per frame rate constraint. If no users are above their assigned maximum per frame rate constraint, then one or more users having a highest per frame rate may be used. In at least one embodiment, the power of a single user is increased in block 66 and the power of a single user is decreased in block 68. The weights ($w_k$) referred to above are values that reflect each user's priority during resource allocation. These weights may or may not be modified during the FW-ASP process. In at least one embodiment, initial weights are provided by a higher level scheduling mechanism. At this point, the candidate sets for some of the subchannels may be enlarged by adding one or more previously rejected users (i.e., users rejected during the initial subset selection) (block 70).

It may next be determined whether all of the candidate sets currently have the desired active set size (block 72). If not, the method 60 may return to block 62 and repeat the process with the newly defined candidate sets, power distribution, and possibly weights (block 72-N). If all of the candidate sets currently have the desired active set size (block 72-Y), then it may next be determined whether all users are at or above (or, in at least one embodiment, sufficiently close to) the minimum per frame rate constraint (block 74). If not, the method 60 may repeat, starting at block 62, with the newly defined candidate sets, power distribution, and possibly weights (block 74-N). If all users are at least close to the minimum per frame rate constraint, then the method 60 may terminate (block 76). If the method 40 of FIG. 3 is used to perform the subset selection for each of the subchannels in block 62, then block 42 and 44 of method 40 may be skipped on each new iteration through the method 60, after an initial iteration.

As described previously, a joint optimization of scheduling and physical beamforming may be performed after initial active sets have been chosen for a plurality of subchannels. This optimization attempts to maximize frame-wise throughput under QoS-related frame-wise rate constraints. In at least one embodiment, users per sub-channel are predetermined by the above-described FW-ASP process to reduce complexity. The FW-ASP process may transfer initial active set assignments, power levels, beam-vectors, and possibly the weights to the BF optimization process. In at least one embodiment, the BF optimization is an iterative process that alternates between power-shift iterations and beam vector iterations. The beam vector iterations attempt to find optimal beam vectors for a given frame-wise power assignment. The power shift iterations attempt to shift the power toward the user/subchannel's that will result in the highest gain in a rate-related parameter (e.g., a weighted-sum rate (WSR), etc.). In one approach, the beam-vector iterations are performed once every several power iterations (although other approaches may alternatively be used). Each beam vector iteration may input an existing power assignment for each user in each subchannel ($p_{ik}$) and channel state information (CSI). The CSI may be generated as part of a separate process. The beam vector iterations are intended to optimize the beam-vectors of active users and, accordingly, the rates of these users within all subchannels.

In the discussion that follows, special terms will be used to categorize users based on their per frame rates as compared to the per frame rate constraints dictated by QoS. For example, a user will be referred to as being "satisfied" if the per-frame rate of the user is between minimum and maximum per-frame rate constraints (i.e., $R_{max,k} \geq R_k \geq R_{min,k}$). A user will be referred to as "underrated" if the per-frame rate of the user is less than the minimum per-frame rate constraint (i.e., $R_k < R_{min,k}$). Lastly, a user will be referred to as "overrated" if the per-frame rate of the user is greater than the maximum per-frame rate constraint (i.e., $R_k > R_{max,k}$).

Each power iteration is intended to raise the power level of at least one underrated user within a subchannel that will result in a highest gain in throughput related parameter, such as weighted-sum rate (WSR). If there are no underrated users, then one or more satisfied users may be used. In one approach, a predetermined power increment value may be added to the user within the corresponding subchannel. An equivalent decrease in power within at least one overrated user is then made that will result in a lowest loss in the throughput related parameter. The total power should remain the same after each power iteration. If there are no overrated users, then one or more satisfied users may be used. In general, throughput gain and loss calculations do not need to be performed in a current power iteration for subchannels whose power assignment was not changed in a previous power iteration. Similarly, each BF iteration can skip subchannels that were not modified by power iteration since the last BF iteration.

Figure 5:
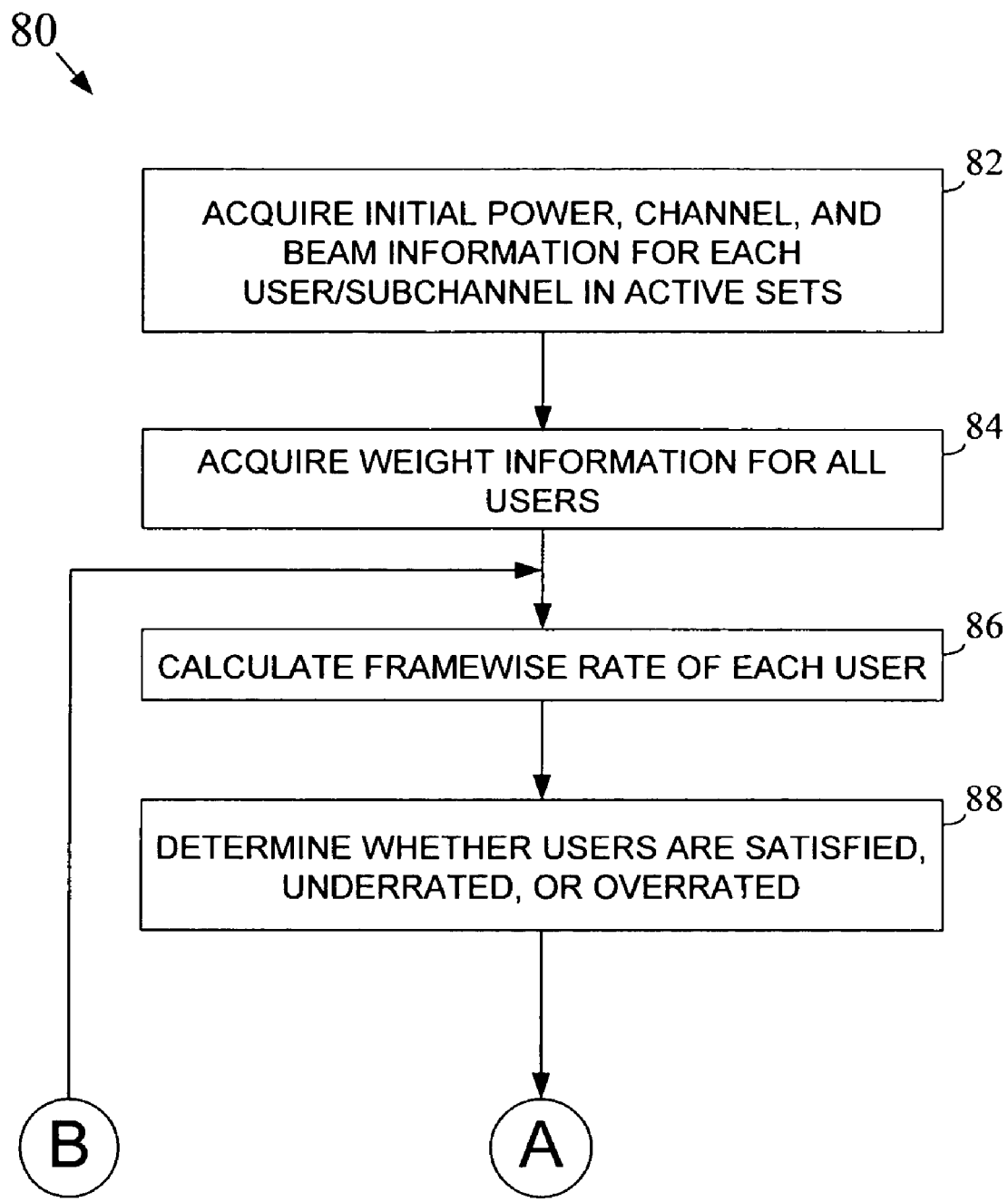
FIGS. 5 and 6 are portions of a flowchart illustrating an example method for performing beam forming optimization in accordance with an embodiment of the present invention.
Figure 6:
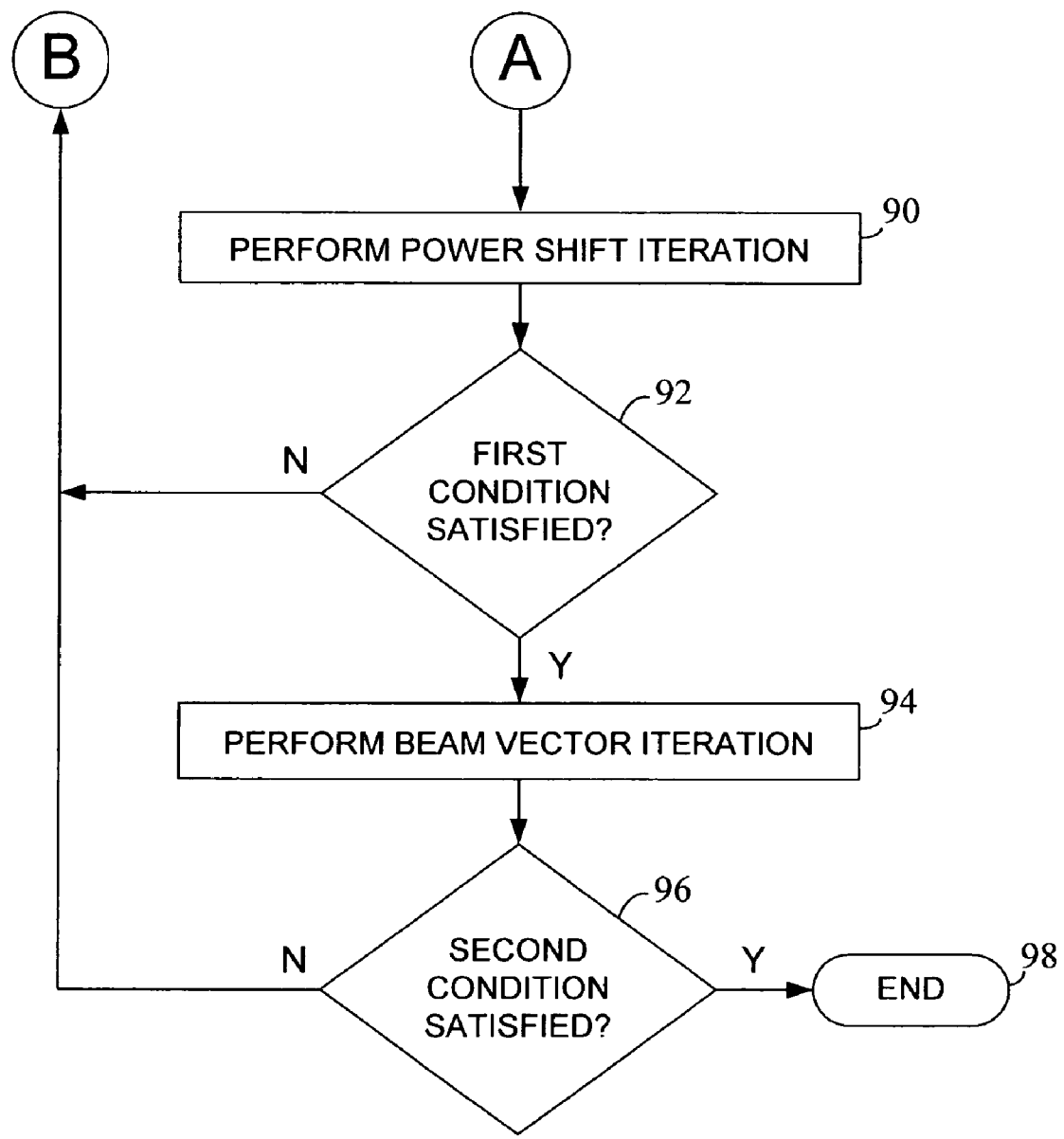

FIGS. 5 and 6 are portions of a flowchart illustrating an example method 80 for performing beam forming optimization in accordance with an embodiment of the present invention. The method 80 is an iterative procedure that may be used to jointly optimize the beamforming and the scheduling for a network coverage region. With reference to FIG. 5, power ($p_{ik}$), channel ($h_{ik}$), and beam vector ($v_{ik}$) information may first be acquired for each combination of user and subchannel in the initial active sets (block 82). As described previously, the FW-ASP process may be used to provide the initial active sets. The FW-ASP process may also generate the initial power information ($p_{ik}$) and the initial beam vector information ($v_{ik}$), where i is the subchannel index and k is the user index. The initial channel information ($h_{ik}$) may be received from a channel estimator or some other source. Weight information $w_k$ may also be acquired at this time for each of the users (block 84). A framewise rate may next be calculated for each of the users (block 86). As described previously, the framewise rate of a user is the sum of the rates of the user within each subchannel that has the user in its active set. Due to uplink-downlink duality, the rate of user k in subchannel i (where k∈A(i) and A(i) is the active set for subchannel i) is given by the uplink expression:

$$R_{ik} = \log(1 + a_{ikk} p_{ik}/(1 + \Sigma_{j \in A(i), j \neq k} a_{ikj} p_{ij}))$$

where $a_{ikj} \equiv |v_{ik} \cdot h^*_{ij}|^2$. The frame wise rate of user k may be expressed as:

$$R_k = \Sigma_{i, k \in A(i)} R_{ik}.$$

After the framewise rates have been determined, it may next be determined whether each of the users are satisfied, underrated, or overrated (block 88).

Referring now to FIG. 6, an initial power shift iteration may next be performed (block 90). As described above, during a power shift iteration, a power level of at least one user within a particular subchannel is increased. The at least one user/subchannel combination that is selected is the one (are the ones) for which the power increase will generate the highest gain in a throughput related parameter. Underrated users are selected if present, but if none are present, satisfied users may be chosen. Also during the power shift iteration, a power level of at least one user/subchannel will be decreased. The total power decrease will be equal to the total power increase performed previously so that the overall power change is zero for the power shift iteration. The at least one user/subchannel that is selected for the decrease is the one (are the ones) for which the power decrease will generate the lowest loss in the throughput related parameter.

To perform the power increases and decreases described above, a predetermined power quantum Δ may be used as an increment/decrement value. In at least one embodiment of the invention, this power quantum Δ may be reduced by a constant proportion each time a power iteration "stalls." A power iteration stalls when the power quantum Δ is added to and subtracted from the same user in the same subchannel during the same iteration. Other techniques for reducing the power quantum Δ under these circumstances may alternatively be used.

In at least one embodiment of the invention, the throughput related parameter that is used during a power shift iteration is a framewise weighted-sum rate (WSR) that is calculated using the priority weights $w_{ik}$ discussed previously. For a subchannel i, the weighted-sum rate may be expressed as follows:

$$WSR_i = WSR_i(p_i) = \Sigma_{k, k \in A(i)} w_k R_{ik}.$$

The "framewise" WSR may then be calculated as:

$$WSR = \Sigma_{i=1:N} WSR_i$$

During a power shift iteration, this parameter may be calculated for each combination of active user and subchannel, both with and without the power increment. One or more combinations that maximize the gain in WSR may then be selected for power increase. The gain may be calculated as follows:

$$G_{ik}(\Delta) \equiv WSR_i(p'_i) - WSR_i(p_i)$$

where $G_{ik}$ is the gain and $p'_i$ is obtained from $p_i$ by $p_{ik} \rightarrow p_{ik} + \Delta$. The same approach may then be performed for a power decrement. One or more active user/subchannel combinations that minimize the loss in WSR may then be selected for power decrease. It should be noted that in a subsequent power shift iteration, the calculated gain and loss values only need to be updated for subchannels that were modified in a current power iteration.

After the power shift iteration is complete, it may next be determined whether a predetermined condition related to the power shift iterations has been satisfied (block 92). In at least one embodiment, this condition may check to determine whether, for example, a predetermined number of power shift iterations have been performed. Other conditions may alternatively be used. If the condition has not been satisfied (block 92-N), then the method may return to block 86 where the framewise rate may be recalculated for each user that has had a change in power level. These users may then be reclassified in block 88 and another power shift iteration may then be performed in block 90. This sequence may repeat until the condition is satisfied (block 92-Y). When the condition is satisfied, a beam vector optimization iteration may next be performed (block 94). The beam vector optimization iteration may utilize a technique similar to the computation of optimal beam vectors for rate maximization described above in association with the ASP process (see, e.g., Equations 1, 2, and 3 above). After such processing, the beam vectors may be calculated as follows for i=1:k:

$$v_i = \text{eigen\_vector\_of\_max\_eigen\_value}(S_i^{-1} \cdot h_i \cdot h_i^*).$$

In general, only the subchannels that were modified in a previous power shift iteration will need to be processed in the beam vector optimization iteration.

After the beam vector iteration has completed, it may be determined whether a second condition has been satisfied (block 96). The second condition will determine when the method 80 terminates. The second condition may require, for example, that a predetermined number of beam vector iterations be performed before the method 80 terminates. In another approach, the second condition may require that all users become "satisfied" users before the method 80 terminates. A multi-part condition may also be used. For example, the second condition may specify a maximum number of beam vector iterations that will be allowed before termination, but allow even earlier termination if all users become "satisfied" users or better before the maximum number is reached. Other conditions may alternatively be used. When the condition is eventually satisfied, the method 80 terminates (block 98).

Figure 7:
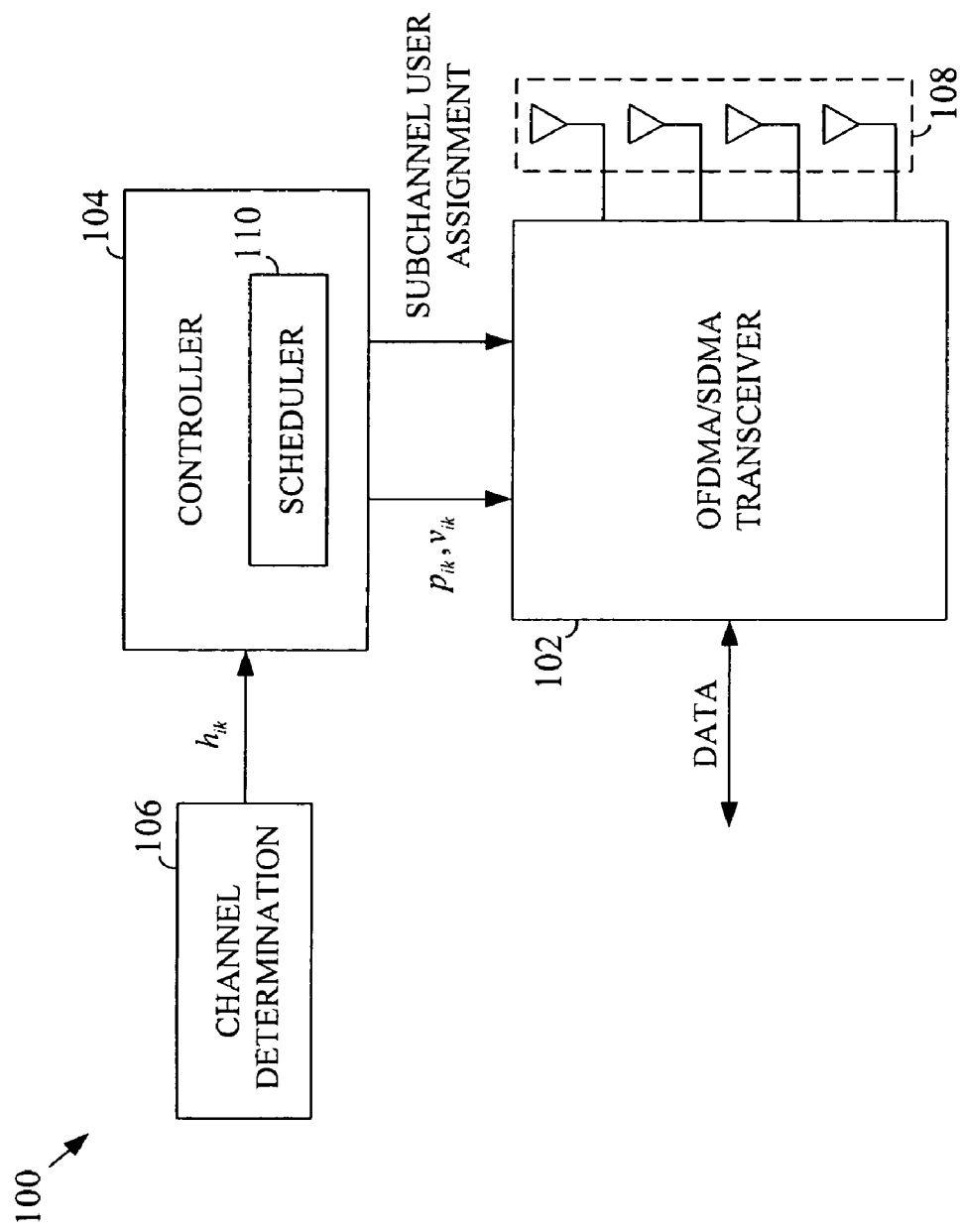
FIG. 7 is a block diagram illustrating an example base station in accordance with an embodiment of the present invention.

FIG. 7 is a block diagram illustrating an example base station 100 in accordance with an embodiment of the present invention. As shown, the base station 100 includes: an OFDMA/SDMA transceiver 102, a controller 104, and a channel determination unit 106. The OFDMA/SDMA transceiver 102 may be coupled to a plurality of antennas 108 to facilitate the transmission and reception of signals to and from the wireless medium. The OFDMA/SDMA transceiver 102 is a multi-user transceiver that is capable of simultaneously servicing multiple users within a coverage region of the base station 100. The controller 104 may include scheduler functionality 110 for use in performing OFDMA scheduling duties within the base station 100. The channel determination unit 106 is operative for determining channel information for various channels serviced by the base station 100. The channel determination unit 106 may include channel estimation functionality for calculating channel estimates for the various channels and/or the channel determination unit 106 may receive and organize channel information generated elsewhere.

In at least one embodiment, the controller 104 is configured to determine parameters for use by the OFDMA/SDMA transceiver 102 to communicate with users within the coverage region of the base station 100 in a spectrally efficient manner. For example, the controller 104 may identify sets of active users for each of the available subchannels to the OFDMA/SDMA transceiver 102. The controller 104 may also determine power information $p_{ik}$ and optimal beamforming vectors $v_{ik}$ to be used by the OFDMA/SDMA transceiver 102. The OFDMA/SDMA transceiver 102 may then transmit data to and receive data from the users within the appropriate subchannels using the specified power levels and beam vectors. This information may be updated on a frame by frame basis. In at least one embodiment of the present invention, the controller 104 may use an iterative beamforming and scheduling procedure (such as, for example, method 80 of FIGS. 5 and 6) to generate the information for use by the transceiver 102. The controller 104 may also use an Active Set Predictor (ASP) process and/or a Frame-Wise Active Set Predictor (FW-ASP) process, as described above, to develop initial active sets and other information for use by the iterative beamforming and scheduling procedure.

In the embodiments described above, novel techniques are described in the context of a base station servicing users in a corresponding coverage region in an OFDMA-based wireless network. It should be appreciated that these techniques may also be used within other applications where wireless communication is taking place with multiple remote entities via multiple parallel channels from a single source.

The techniques and structures of the present invention may be implemented in any of a variety of different forms. For example, features of the invention may be embodied within base stations; wireless access points; communication satellites; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In at least one embodiment, two or more of the blocks in a block diagram may be implemented in software within a single (or multiple) digital processing device(s). The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
   identifying a small set of active users having high throughput potential for each of a plurality of subchannels in an orthogonal frequency division multiplexing (OFDM) band being used by a base station, each small set of active users to share a corresponding subchannel using spatial division multiple access (SDMA) techniques; and
   after identifying said small sets of active users, performing power adjustment and beam vector optimization for active users in said small sets in an iterative manner, said power adjustment to increase power associated with one or more active users and decrease power associated with one or more other active users in a manner that improves quality of service (QoS) compliance and said beam vector optimization to optimize beam vectors associated with subchannels that have been affected by said power adjustment;
   wherein performing power adjustment and beam vector optimization for active users in said small sets includes performing multiple power adjustment iterations for each beam vector optimization iteration, wherein each power adjustment iteration increases the power associated with one active user and decreases the power associated with one active user.

2. The method of claim 1, wherein:
   identifying a small set of active users includes:
      initially designating all users in said base station coverage region as candidate users for a first subchannel in said OFDMA bandwidth;
      calculating a performance metric for each candidate user associated with said first subchannel; and
      reducing the number of candidate users associated with said first subchannel based on said calculated performance metrics.

3. The method of claim 2, wherein:
   identifying a small set of active users further includes repeating calculating and reducing in an iterative manner until a desired number of candidate users has been reached.

4. The method of claim 3, wherein:
   reducing the number of candidate users includes eliminating a predetermined percentage of said users during each iteration without going below said desired number of candidate users.

5. The method of claim 1, wherein:
   identifying a small set of active users includes identifying a small set of active users for each subchannel that allows each user to at least come close to a minimum per frame rate dictated by quality of service (QoS) constraints.

6. The method of claim 1, wherein:
   identifying a small set of active users includes:
      selecting a subset of users for each subchannel in a manner that does not take quality of service (QoS) into account;
      calculating rate per frame for each user;
      increasing power of one or more users that are below a QoS related minimum per frame rate; and
      decreasing power of one or more users that are above a QoS related maximum per frame rate;
      wherein power increases are substantially equal to power decreases.

7. The method of claim 6, wherein:
   identifying a small set of active users includes repeating calculating rate per frame for each user, increasing power of one or more users, and decreasing power of one or more users until all users are at least close to said QoS-related minimum per frame rate.

8. The method of claim 1, wherein:
   performing power adjustment and beam vector optimization for active users in said small sets includes:
      calculating a framewise rate for each active user; and
      determining whether each active user is a satisfied user, an underrated user, or an overrated user;
      wherein each power adjustment iteration increase the power associated with an underrated user, if any, and decreases the power associated with an overrated user, if any.

9. The method of claim 1, wherein:
   each power adjustment iteration selects an active user for power increase based on which active user and subchannel will generate a highest gain in weighted sum rate (WSR) when power is increased.

10. The method of claim 9, wherein:
    each power adjustment iteration selects an active user for power decrease based on which active user and subchannel will generate a smallest decrease in weighted sum rate (WSR) when power is decreased.

11. An apparatus comprising:
    an orthogonal frequency division multiple access (OFDMA) spatial division multiple access (SDMA) transceiver to transmit data to and receive data from a plurality of users via a plurality of OFDMA subchannels, wherein multiple users may simultaneously share each subchannel using SDMA techniques, said OFDMA/SDMA transceiver to be connected to multiple antennas; and
    a controller including scheduling functionality to dynamically assign users to subchannels and to determine beamforming data for each user/subchannel, said controller having:
       logic to identify a small set of active users having high throughput potential for each of a plurality of subchannels in an orthogonal frequency division multiplexing (OFDM) band, each small set of active users to share a corresponding subchannel; and
       logic to perform power adjustment and beam vector optimization, after said small sets of active users have been identified, for active users in said small sets in an iterative manner, said power adjustment to increase power associated with one or more active users and decrease power associated with one or more other active users in a manner that improves quality of service (QoS) compliance and said beam vector optimization to optimize beam vectors associated with subchannels that have been affected by said power adjustment;

wherein said logic to perform power adjustment and beam vector optimization for active users in said small sets includes logic to perform multiple power adjustment iterations for each beam vector optimization iteration, wherein each power adjustment iteration increases the power associated with one active user and decreases the power associated with one active user.

12. The apparatus of claim 11, wherein:
said logic to perform power adjustment and beam vector optimization for active users in said small sets includes:
  logic to calculate a framewise rate for each active user; and
  logic to determine whether each active user is a satisfied user, an underrated user, or an overrated user;
  wherein each power adjustment iteration increases the power associated with an underrated user, if any, and decreases the power associated with an overrated user, if any.

13. The apparatus of claim 11, wherein:
each power adjustment iteration selects an active user for power increase based on which active user and subchannel will generate a highest gain in weighted sum rate (WSR) when power is increased.

14. The apparatus of claim 13, wherein:
each power adjustment iteration selects an active user for power decrease based on which active user and subchannel will generate a smallest decrease in weighted sum rate (WSR) when power is decreased.

15. An article comprising a tangible and non-transitory computer readable storage medium having instructions stored thereon that, when executed by a computing platform, operate to:
  identify a small set of active users having high throughput potential for each of a plurality of subchannels in an orthogonal frequency division multiplexing (OFDM) band being used by a base station, each small set of active users to share a corresponding subchannel using spatial division multiple access (SDMA) techniques; and
  after identifying said small sets of active users, performing power adjustment and beam vector optimization for active users in said small sets in an iterative manner, said power adjustment to increase power associated with one or more active users and decrease power associated with one or more other active users in a manner that improves quality of service (QoS) compliance and said beam vector optimization to optimize beam vectors associated with subchannels that have been affected by said power adjustment;
  wherein operation to perform power adjustment and beam vector optimization for active users in said small sets includes operation to perform multiple power adjustment iterations for each beam vector optimization iteration, wherein each power adjustment iteration increases the power associated with one active user and decreases the power associated with one active user.

16. The article of claim 15, wherein:
each power adjustment iteration selects an active user for power increase based on which active user and subchannel will generate a highest gain in weighted sum rate (WSR) when power is increased.

17. The article of claim 16, wherein:
each power adjustment iteration selects an active user for power decrease based on which active user and subchannel will generate a smallest decrease in weighted sum rate (WSR) when power is decreased.

18. A system comprising:
an orthogonal frequency division multiple access (OFDMA) spatial division multiple access (SDMA) transceiver to transmit data to and receive data from a plurality of users via a plurality of OFDMA subchannels, wherein multiple users may simultaneously share each subchannel using SDMA techniques;
a plurality of dipole antennas coupled to said OFDMA/SDMA transceiver to facilitate the transmission and reception of wireless signals; and
a controller including scheduling functionality to dynamically assign users to subchannels and to determine beamforming data for each user/subchannel, said controller having:
  logic to identify a small set of active users having high throughput potential for each of a plurality of subchannels in an orthogonal frequency division multiplexing (OFDM) band, each small set of active users to share a corresponding subchannel; and
  logic to perform power adjustment and beam vector optimization, after said small sets of active users have been identified, for active users in said small sets in an iterative manner, said power adjustment to increase power associated with one or more active users and decrease power associated with one or more other active users in a manner that improves quality of service (QoS) compliance and said beam vector optimization to optimize beam vectors associated with subchannels that have been affected by said power adjustment;
  wherein said logic to perform power adjustment and beam vector optimization for active users in said small sets includes logic to perform multiple power adjustment iterations for each beam vector optimization iteration, wherein each power adjustment iteration increases the power associated with one active user and decreases the power associated with one active user.

19. The system of claim 18, wherein:
each power adjustment iteration selects an active user for power increase based on which active user and subchannel will generate a highest gain in weighted sum rate (WSR) when power is increased.

20. The system of claim 19, wherein:
each power adjustment iteration selects an active user for power decrease based on which active user and subchannel will generate a smallest decrease in weighted sum rate (WSR) when power is decreased.

* * * * *